United States Patent [19]

Chisari et al.

[11] Patent Number: 4,861,600
[45] Date of Patent: Aug. 29, 1989

[54] METHOD OF IMPROVING CHEWING GUM TO REDUCE ALDITOL BULKING AGENT SPOTS USING GUM REWORK MATERIAL

[75] Inventors: Paul R. Chisari, Chicago, Ill.; Christian Midon, Wihr au Val, France

[73] Assignee: Wm. Wrigley Jr., Company, Chicago, Ill.

[21] Appl. No.: 265,740

[22] Filed: Nov. 1, 1988

[51] Int. Cl.⁴ ............................................. A23G 3/30
[52] U.S. Cl. ........................................... 426/3; 426/5
[58] Field of Search ........................................ 426/3–6

[56] References Cited

U.S. PATENT DOCUMENTS

| | | | |
|---|---|---|---|
| 1,852,005 | 4/1932 | Garbutt . | |
| 2,156,810 | 5/1939 | Garbutt | 107/54 |
| 2,256,190 | 9/1941 | Bowman | 107/54 |
| 2,460,698 | 2/1949 | Lindhe | 426/5 |
| 3,262,784 | 7/1966 | Bucher | 426/5 |
| 3,455,755 | 7/1969 | Phillips | 156/204 |
| 3,492,131 | 1/1970 | Schlatter | 99/141 |
| 3,642,491 | 2/1972 | Schlatter | 99/28 |
| 3,644,169 | 2/1972 | Phillips | 99/135 |
| 3,857,965 | 12/1974 | Ream | 426/3 |
| 4,000,321 | 12/1976 | Mochizuki | 426/3 |
| 4,370,350 | 1/1983 | Fisher et al. | 426/5 |
| 4,555,407 | 11/1985 | Kramer et al. | 426/5 |
| 4,588,592 | 5/1986 | Elias | 426/5 |
| 4,806,364 | 2/1989 | Kubota | 426/5 |

OTHER PUBLICATIONS

L. A. Dreyfus Co., "Recommendations for the Manufacture of Chewing Gum," p. 5 (1961).
L. A. Dreyfus Co., Untitled Manual of Chewing Gum, Manufacturing Procedures, p. 11 (1980).

Primary Examiner—Jeanette Hunter
Attorney, Agent, or Firm—Willian Brinks Olds Hofer Gilson & Lione

[57] ABSTRACT

Spots in manufactured chewing gum caused by sorbitol or other alditol bulking agents are reduced or eliminated by adding trim and a non-aqueous liquid softener to gum base and premixing before the addition of bulking agents and other ingredients.

15 Claims, No Drawings

METHOD OF IMPROVING CHEWING GUM TO REDUCE ALDITOL BULKING AGENT SPOTS USING GUM REWORK MATERIAL

BACKGROUND OF THE INVENTION

This invention relates to chewing gum. More particularly, it relates to a method of improving chewing gum to reduce spots of unincorporated alditol bulking agents, such as sorbitol, in manufactured gum, which can impede processing and may show up as product defects.

Sugar alcohols, also known as alditols, are a common ingredient in so-called "sugarless gums". Sorbitol, a six-carbon sugar alcohol having the empirical formula $C_6H_{14}O_6$, is the most common ingredient in such chewing gums, although mannitol and xylitol are also commonly used. These sugar alcohols serve as bulking agents, i.e., major ingredients to provide bulk to the chewing gum composition, and to provide sweetness to the chewing gum. Alditols are also occasionally added to sugar gums for various reasons. Sheets or pieces of gum which include bulking agents such as sorbitol or mannitol, however, may contain spots of unincorporated bulking agents. Such spots can impede processing and may show up as product defects.

Normal gum production produces scraps of gum (known as gum scrap, trim, rework or waste material) which must be discarded as waste if not used by being included in subsequently processed gum. For example, Kramer et al. U.S. Pat. No. 4,555,407, issued Nov. 26, 1985, describes as prior art the use of 7 to 15 weight percent of rework as an ingredient in chewing gum compositions, and discloses a continuous process of forming chewing gum slabs which may reduce the proportion of rework to about 5 percent. According to traditional batch processing of chewing gum compositions, trim is added after the addition of bulking agents is started.

Attempts to control bulking agent spotting in the past have been unsuccessful. Early addition of liquids and longer mixing schedules have proven ineffective in controlling spots of bulking agent in the past. Experiments have shown, for example, that early additions of glycerin softener without early trim addition, and early additions of trim without early glycerin softener or lubricant addition, both result in high spot counts. Furthermore, early addition of trim without early addition of softener is undesirable because of the need to avoid excessive mixer loads (too much torque will break the mixer blade or damage the mixer motor).

SUMMARY OF THE INVENTION

According to the present invention, it has been found that in a process of manufacturing chewing gum, of a composition comprising at least one chewing gum base; at least one sugar alcohol bulking agent; at least one non-aqueous liquid softener selected from the group consisting of glycerin, propylene glycol, lecithin, oils, fats, acetylated monoglycerides and mono-, di- and tri-fatty acid esters of glycerin; the improvement which comprises:

(a) adding trim material, having essentially the same composition as the other ingredients of the gum, and at least one non-aqueous liquid softener to gum base;

(b) premixing the trim material, liquid softener and gum base before the addition of bulking agents;

(c) adding alditol bulking agents and other desired ingredients to the premixed trim material, liquid softener and gum base;

(d) mixing the trim material, liquid softener, gum base, bulking agents and other desired ingredients until a suitable homogenous gum mass is achieved; and (e) forming and cutting the mixed ingredients into the desired chewing gum product shape;

reduces the occurrence of spots of unincorporated bulking agents, and in some cases allows a higher proportion of the product to be trim material, without overloading the mixer or producing nonhomogeneous gum batches.

It should be noted that gum base frequently includes such materials as lecithin, oils, fats, acetylated monoglycerides and glycerol monostearate, and that these materials act as softeners when so included. The specified addition of non-aqueous liquid softener to the gum base in step "(a)" is in addition to whatever softeners may have been previously present in the gum base.

The present invention allows the use of from about 5 to about 50 percent by weight of trim material (based on the total weight of ingredients, excluding trim material), preferably from about 10 to about 40 percent, and most preferably about 15 percent. The amount of liquid softener should be from about 0.5 to about 25 percent by weight (based on the total weight of ingredients, including liquid softener, but excluding trim material), preferably from about 1 to about 15 percent, more preferably about 3 to about 10%, and most preferably about 4 percent. The length of time the trim material, liquid softener and gum base are premixed can vary from about 0.5 to about 10 minutes, is preferably from about 1 to about 5 minutes, and is most preferably about 2 minutes.

In some cases, it is preferred to reduce the rate at which bulking agents such as sorbitol and mannitol are added, in conjunction with the inventive method, but this is by no means necessary or even advisable in all circumstances.

It is also anticipated that the present invention could be carried out in a continuous mixing process, utilizing a single or multiple screw extruder.

DETAILED DESCRIPTION

The present invention utilizes conventional chewing gum compositions.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate, terpene resins and estergums. Fats and oils may also be included in the gum base, including tallow, hydrogenated and partial hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 10 to about 50 percent by weight of the gum base.

Gum bases typically also contain softeners, including glycerol monostearate and glycerol triacetate. Further gum bases may also contain optional ingredients such as anti-oxidants, colors and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol, mannitol, xylitol, and the like. The water soluble portion may also include aqueous solutions of sugars or sugar alcohols, such as corn syrups, hydrogenated starch hydrolysate syrups, and sorbitol solutions. In the present invention, the bulking agent will include at least one alditol, which will comprise at least 30% of the total bulking agent.

Non-aqueous liquid softeners which are added to the chewing gum in order to optimize the chewability and mouth feel of the gum may be either water soluble or insoluble. Softeners, also known in the art as plasticizers or plasticizing agents, may generally, according to the invention, constitute from about 0.5 to about 25 percent by weight of the chewing gum. Softeners contemplated by the present invention include glycerin, propylene glycol, lecithin, oils, fats, acetylated monoglycerides, mono-, di-, and tri-fatty acid esters of glycerin, and combinations thereof.

Both sugarless gum formulations and formulations containing sugar and an alditol are within the scope of the invention. Sugar sweeteners generally include saccharide components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars. Sugarless sweeteners may comprise sugar alcohols such as sorbitol, mannitol, xylitol, hydrogenated starch hydrolysates, maltitol, and the like, alone or in any combination. The sugar alcohols function not only as sweeteners for sugarless gums, but as bulking agents, i.e., a water-soluble component of the gum base which provides bulk. A preferred sugarless sweetener which does not function as a bulking agent is the dipeptide sweetener aspartame (L-aspartyl-L-phenylalanine methyl ester, disclosed in U.S. Pat. Nos. 3,492,131, issued Jan. 27, 1970, to Schlatter, and 3,642,491, issued Feb. 15, 1972, to Schlatter) in an amount of about 0.025 percent to about 0.5 percent, but preferably about 0.3 percent, by weight of the chewing gum product. A natural high-potency sweetener with flavor enhancing properties is glycyrrhizin. Other high-potency sweeteners which can be used include acesulfame K, sucralose, thaumatin and alitame.

A flavoring agent may be present in the chewing gum in an amount within the range of from about 0.1 to about 10.0 weight percent of the gum. The flavoring agents may comprise essential oils, synthetic flavors, or mixtures thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be in any sensorally acceptable blend. All such flavors and flavor blends are contemplated by the present invention.

Optional ingredients such as colors, emulsifiers and pharmaceutical agents may be added to the chewing gum.

In general, chewing gum is manufactured using the well-known method of sequentially combining the various chewing gum ingredients in a commercially available mixer known in the art. After the ingredients have been thoroughly mixed, the gum mass is discharged from the mixer and shaped into the desired form such as by rolling into sheets and cutting into sticks or tabs, extruding and cutting into chunks or casting into pellets.

Generally, the ingredients are mixed by first melting the gum base and adding it to the running mixer. The base may also be melted in the mixer itself. Color or emulsifiers may also be added at this time. At this point, the non-aqueous liquid softener and the trim are added and mixing continues for a period of time. Aqueous softeners may also be added at this point, or they may be added later. It is important that the trim and non-aqueous liquid softener be added at about the same time so that they are incorporated together into the gum base. If one is added before the other, the second must be added before the first is substantially incorporated into the base. Next, portions of the bulking agent are added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

Mixing time (i.e., how long a period elapses after mixing is started, before the mixer is shut off) is determined initially by visual inspection of homogeneity of the gum mass. Mixing times vary greatly from one product to another, and are affected not only by the gum formula, but also by the order and times of ingredient addition. Excessive mixing is to be avoided, as this will increase toughness of the finished product. Similarly, intermediate mix times (i.e., how long to wait before adding the next ingredient) and ingredient addition rates are also set by observation. Increases in intermediate mix times result in longer total mix times. Once a proper mix schedule is determined experimentally for a given chewing gum formula, that mix schedule may be used reliably in routine production. It has been found that modifying a traditional mix schedule by early addition of trim material and liquid softener in accordance with the present invention causes an increase of typically 3 minutes in the total mixing time.

If continuous mixing in a single or multiple screw extruder is desired, the base, liquid softener and trim should be added at the beginning of the screw, while bulking agents and other ingredients are added as the gum mass moves down the screw assembly.

Bulking agent spot occurrence is an intermittent phenomenon, i.e., it does not occur all the time in every product formulation or with every combination of processing equipment. Spotting may be affected by the grade of ingredients employed, for example the particle size of the sorbitol bulk filler used. Spotting may be affected by the mixer configurations, such as the blade clearance, blade configuration, chamfer on each blade, depth of discharge gate, depth of the sigma blade wells, overall length and width of the mixer above the saddle point, and sidewall clearance. It is possible to control spot occurrence by adjusting the enumerated factors, but the present invention offers a method of controlling spot occurrence without checking and adjusting each factor which might be contributing to spotting.

The invention will now be illustrated with Examples.

EXAMPLE 1

Two groups of batches of gum are mixed, both having the same ingredients, but in which the ingredients are added in different orders. The first group (Group A) is made according to a procedure known in the art, and the second group (Group B) is made according to the invention. The proportions of the components of the two groups of batches are given in parts by weight, which (because the total parts by weight, excluding trim, add to 100.00 parts, and because the trim has the same composition as the total remaining composition) are equal to the percentage by weight, either including or excluding trim. The time of addition is given in minutes elapsed since the start of mixing. Mixing is continuous during the addition of ingredients. A range in times indicates that the ingredient is added gradually over the indicated times.

|  |  | Addition time: | |
| --- | --- | --- | --- |
| Ingredient | Amount | Group A | Group B |
| Gum Base | 25.00 parts | 0 minutes | 0 minutes |
| Trim | 16.00 | * | 0 |
| Glycerin | 17.00 | * | 0 |
| Lecithin | 0.18 | 2 | 2 |
| Sorbitol | 56.13 | 2–5 | 2–8 |
| Peppermint Oil (flavor) | 1.44 | 2.5–5 | 2.5–5 |
| Aspartame (sweetener) | 0.25 | 6 | 9 |
| Trim | 16.00 | 6 | * |
| Glycerin | 17.00 | 6 | * |
| (Mixing completed) |  | 10 | 13 |

*Trim and glycerin are listed twice, but are only added once in each batch.

Both groups of batches are mixed in production scale double arm sigma blade mixers. A total of eight batches are produced on two separate days, four batches using each procedure. The batches are sheeted and the sorbitol spots are counted. The average numbers of sorbitol spots per 270 sheets, 19.5" by 17.25" (495 mm by 438 mm) in size, are 30 for Group A (prior art control) and 4 for Group B (invention).

EXAMPLE 2

Example 1 is repeated with a different formulation, and with the other differences noted.

|  |  | Addition time: | |
| --- | --- | --- | --- |
| Ingredient | Amount | Group C | Group D |
| Gum Base | 24.37 parts | 0 minutes | 0 minutes |
| Lecithin | 0.13 | 0 | 0 |
| Trim | 22.00 | * | 0 |
| 70% Sorbitol solution | 10.20 | * | 0 |
| Glycerin | 3.92 | * | 0 |
| Color | 0.013 | * | 0 |
| Sorbitol | 44.757 | 2–5 | 2–8 |
| Peppermint Oil (flavor) | 1.40 | 3–5 | 3–5 |
| Mannitol | 5.01 | 6 | 9 |
| Glycerin | 3.92 | 6 | * |
| Trim | 22.00 | 6 | * |
| Color | 0.013 | 6 | * |
| 70% Sorbitol solution | 10.20 | 8 | * |
| Xylitol | 10.20 | 10 | 13 |
| (Mixing completed) |  | 13 | 16 |

*Trim, 70% sorbitol solution, glycerin and color are listed twice, but are only added once in each batch.

A total of four batches are produced in one day, two batches using each procedure. The average numbers of sorbitol spots per 270 sheets, 19.5" by 17.25" (495 mm by 438 mm) in size, are 15 for Group C (prior art control) and 6 for Group D (invention).

The same formula of Groups C and D is mixed according to a different mixing schedule, as set out below for Group E. No improvement in incidence of sorbitol spots, as compared to the control (Group C), is noted. The lack of improvement is attributed to the insufficient amount (0.13 parts per 100, excluding trim) of liquid softener (lecithin) added at the beginning of mixing Group E, as compared to the amount (4.05 parts per 100, excluding trim) of liquid softener (lecithin and glycerin) added at the beginning of mixing Group D.

| Ingredient | Amount | Addition Time Group E |
| --- | --- | --- |
| Gum Base | 24.37 parts | 0 minutes |
| Trim | 22.00 | 0 |
| Lecithin | 0.13 | 0 |
| Sorbitol | 44.757 | 2–13 |
| Peppermint Oil (flavor) | 1.40 | 3–5 |
| Glycerin | 3.92 | 14 |
| Mannitol | 5.01 | 14 |
| 70% Sorbitol solution | 10.20 | 14 |
| Color | 0.013 | 14 |
| Xylitol | 10.20 | 16 |
| (Mixing completed) |  | 21 |

EXAMPLE 3

Example 1 is repeated with yet a different formulation, and with the other differences noted.

|  |  | Addition time: | |
| --- | --- | --- | --- |
| Ingredient | Amount | Group F | Group G |
| Gum Base | 25.31 parts | 0 minutes | 0 minutes |
| Glycerin | 9.30 | * | 0 |
| Trim | 18.00 | * | 0 |
| Hydrogenated Glucose Syrup | 6.33 | * | 0 |
| Lecithin | 0.13 | 2 | 2 |
| Sorbitol | 49.10 | 2–5 | 2–8 |
| Peppermint Oil (flavor) | 1.44 | 2.5–5 | 2.5–5 |
| Mannitol | 8.14 | 6 | 9 |
| Aspartame (sweetener) | 0.25 | 6 | 9 |
| Trim | 18.00 | 6 | * |
| Glycerin | 9.30 | 6 | * |
| Hydrogenated Glucose Syrup | 6.33 | 6 | * |
| (Mixing completed) |  | 10 | 13 |

*Glycerin, trim and hydrogenated glucose syrup are listed twice, but are only added once in each batch.

A total of four batches are produced in one day, two batches using each procedure. The average numbers of sorbitol spots per 270 sheets, 19.5" by 17.25" (495 mm by 438 mm) in size, are 8 for Group F (prior art control) and 1.5 for Group G (invention).

EXAMPLE 4

Example 1 is again repeated with yet a further formulation, and with the other differences noted.

| Ingredient | Amount | Addition time: Group H | Addition time: Group I |
|---|---|---|---|
| Gum Base | 24.73 parts | 0 minutes | 0 minutes |
| Trim | 33.00 | * | 0 |
| Glycerin | 17.06 | * | 0 |
| Lecithin | 0.10 | 2 | 2 |
| Sorbitol | 56.53 | 2–5 | 2–8 |
| Spearmint Oil (flavor) | 1.33 | 2.5–5 | 2.5–5 |
| Aspartame (sweetener) | 0.25 | 6 | 9 |
| Trim | 33.00 | 6 | * |
| Glycerin | 17.06 | 6 | * |
| (Mixing complete) |  | 10 | 13 |

*Trim and glycerin are listed twice, but are only added once in each batch.

A total of six batches are produced in one day, two batches using the Group H procedure and four using the Group I procedure. The average numbers of sorbitol spots per 270 sheets, 19.5" by 17.25" (495 mm by 438 mm) in size, are 21 for Group H (prior art control) and 2 for Group I (invention).

As noted above, it is preferred that the gum base be heated before being added to the mixer. The trim and liquid softener are preferably added to the melted gum base (at about 93° C.) in the mixer. It is acceptable to use a non-aqueous liquid softener such as glycerin as the sole liquid softener with the trim. It is also acceptable to add an aqueous sugar or sugar alcohol solution, such as 70% sorbitol solution, with the base and trim, but a reduced quantity of a non-aqueous liquid softener is still necessary. This may be because the non-aqueous liquid softener blocks the tendency of the sorbitol to form lumps in 70% sorbitol solution through either lubrication or some other effect.

CONTROL EXPERIMENT

A further experiment is conducted to determine whether early addition of liquid softener, alone, would reduce sorbitol spotting. Two batches of gum are made with the same ingredients, but varying the order of addition and mixing schedule. The two batches are mixed as follows:

| Ingredient | Amount | Addition time: Batch J | Addition time: Batch K |
|---|---|---|---|
| Gum Base | 25.0 parts | 0 minutes | 0 minutes |
| Color | 0.5 | 5 | 0 |
| Glycerin | 12.736 | * | 0 |
| Talc | 3.0 | 5 | 0 |
| Sorbitol | 52.314 | 7–12 | 2–7 |
| Cinnamon Flavor | 1.8 | 7–8.5 | 2–3.5 |
| Mannitol | 4.0 | 13.5 | 8.5 |
| Glycerin | 6.368 | 13.5 | * |
| Aspartame | 0.250 | 13.5 | 8.5 |
| Glycerin | 6.368 | 17 | * |
| Water | 0.4 | 17 | 12 |
| (Mixing ended) |  | 22 | 17 |

*Glycerin is added once (total amount at start) for Batch K and twice (half amounts at two points in time) for Batch J.

In this experiment trim is not added in either case, but the liquid softener added early in the processing of Batch K results in a significant increase in sorbitol spot count. In Batch J, there are no sorbitol spots observed. In Batch K, they are too numerous to count.

We claim:

1. In a process of manufacturing chewing gum, of a composition comprising at least one chewing gum base; at least one sugar alcohol bulking agent; at least one non-aqueous liquid softener selected from the group consisting of glycerin, propylene glycol, lecithin, oils, fats, acetylated monoglycerides and mono- , di- , and tri-fatty acid esters of glycerin; the improvement which comprises:
   (a) adding trim material, having essentially the same composition as the other ingredients of the gum, and at least one non-aqueous liquid softener to gum base;
   (b) premixing the trim material, liquid softener and gum base before the addition of bulking agents;
   (c) adding alditol bulking agents and other desired ingredients to the premixed trim material, liquid softener and gum base;
   (d) mixing the trim material, liquid softener, gum base, bulking agents and other desired ingredients until a suitable homogenous gum mass is achieved; and
   (e) forming and cutting the mixed ingredients into the desired chewing gum shape.

2. A process according to claim 1, wherein the amount of trim is within the range of from about 5 to about 50% by weight of the gum composition.

3. A process according to claim 1, wherein the amount of trim is within the range of from about 10 to about 40% by weight of the gum composition.

4. A process according to claim 1, wherein the amount of trim is about 15% by weight of the gum composition.

5. A process according to claim 1, wherein the amount of liquid softener is within the range of from about 0.5 to about 25% by weight of the gum composition.

6. A process according to claim 1, wherein the amount of liquid softener is within the range of from about 1 to about 15% by weight of the gum composition.

7. A process according to claim 1, wherein the amount of liquid softener is within the range of from about 3 to about 10% by weight of the gum composition.

8. A process according to claim 1, wherein the amount of liquid softener is about 4% by weight of the gum composition.

9. A process according to claim 1, wherein the liquid softener is glycerin.

10. A process according to claim 1, wherein aqueous sugar or sugar alcohol solution is added with the non-aqueous softener.

11. A process according to claim 1, wherein the length of time the trim material, liquid softener and gum base are premixed is from about 0.5 to about 10 minutes.

12. A process according to claim 1, wherein the length of time the trim material, liquid softener and gum base are premixed is from about 1 to about 5 minutes.

13. A process according to claim 1, wherein the length of time the trim material, liquid softener and gum base are premixed is about 2 minutes.

14. A process according to claim 1, wherein the mixing is carried out in a twin sigma blade mixer.

15. A process according to claim 1, wherein the mixing is carried out in a single or multiple screw extruder.

* * * * *

UNITED STATES PATENT AND TRADEMARK OFFICE
CERTIFICATE OF CORRECTION

PATENT NO. : 4,861,600
DATED : August 29, 1989
INVENTOR(S) : Paul R. Chisari et al.

It is certified that error appears in the above-identified patent and that said Letters Patent is hereby corrected as shown below:

In column 6, line 37, please delete "392" and substitute therefor --3.92--.

In column 6, line 57, please delete "814" and substitute therefor --8.14--.

In column 7, line 54, please delete "05" and substitute therefor --0.5--.

Signed and Sealed this

Ninth Day of June, 1992

*Attest:*

DOUGLAS B. COMER

*Attesting Officer*     *Acting Commissioner of Patents and Trademarks*